US 9,738,240 B2

(12) United States Patent
Kogure

(10) Patent No.: US 9,738,240 B2
(45) Date of Patent: Aug. 22, 2017

(54) WIRE HARNESS

(71) Applicant: Yazaki Corporation, Minato-ku, Tokyo (JP)

(72) Inventor: Naoto Kogure, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/164,001

(22) Filed: May 25, 2016

(65) Prior Publication Data

US 2016/0264076 A1    Sep. 15, 2016

Related U.S. Application Data

(63) Continuation of application No. PCT/JP2014/080809, filed on Nov. 20, 2014.

(30) Foreign Application Priority Data

Nov. 27, 2013  (JP) .................. 2013-245300
Oct. 24, 2014  (JP) .................. 2014-217383

(51) Int. Cl.
*H02G 3/00*       (2006.01)
*B60R 16/02*      (2006.01)
*B60R 16/027*     (2006.01)
*H02G 11/00*      (2006.01)
*H02G 3/06*       (2006.01)
*H02G 3/04*       (2006.01)

(52) U.S. Cl.
CPC ........ *B60R 16/0215* (2013.01); *B60R 16/027* (2013.01); *H02G 3/04* (2013.01); *H02G 3/0616* (2013.01); *H02G 11/00* (2013.01); *H02G 3/0468* (2013.01)

(58) Field of Classification Search
CPC .... B60R 16/0215; B60R 16/027; H02G 3/04; H02G 11/00; H02G 3/0616
USPC ........................................ 174/70 R
See application file for complete search history.

(56) References Cited

U.S. PATENT DOCUMENTS

| 2007/0084619 A1* | 4/2007 | Kisu ................... B60R 16/0215 174/72 A |
| 2007/0119610 A1* | 5/2007 | Kisu ................... H02G 11/006 174/72 A |
| 2014/0299370 A1 | 10/2014 | Ikeda |

FOREIGN PATENT DOCUMENTS

| JP | 2007-151257 A | 6/2007 |
| JP | 2008-178208 A | 7/2008 |
| JP | 2008-308070 A | 12/2008 |
| JP | 2013-150540 A | 8/2013 |
| JP | 2013-162716 A | 8/2013 |

OTHER PUBLICATIONS

English Translation JP2007-151257.*
English Translation JP2008-178208.*
English Translation JP2008-308070.*
(Continued)

*Primary Examiner* — Steven T Sawyer
(74) *Attorney, Agent, or Firm* — Banner & Witcoff, Ltd.

(57) ABSTRACT

One end side of a corrugated tube is urged forward or backward in a closing direction, among a circumference direction around a vertical direction passing through the one end of the corrugated tube, in which a slide structural body is closed with respect to a vehicle body so that the corrugated tube is bendable in a U-shape.

6 Claims, 15 Drawing Sheets

(56) References Cited

OTHER PUBLICATIONS

Feb. 17, 2015—International Search Report—Intl App PCT/JP2014/080809.
Feb. 28, 2017—(CN)—The First Office Action—App 201480065170.6.
May 9, 2017—(JP) Notification of Reasons for Refusal—App 2014-217383.

* cited by examiner

WIRE HARNESS

CROSS REFERENCE TO RELATED APPLICATION

This application is a continuation of PCT application No. PCT/JP2014/080809, which was filed on Nov. 20, 2014 based on Japanese Patent Application (No. 2013-245300) filed on Nov. 27, 2013, and Japanese Patent Application (No. 2014-217383) filed on Oct. 24, 2014, the contents of which are incorporated herein by reference. Also, all the references cited herein are incorporated as a whole.

BACKGROUND OF THE INVENTION

1. Technical Field

The present invention relates to a wire harness in which a bundle of cables is protected by an exterior member and, more particularly, to a wire harness that is routed in the vicinity of the doorway of each of slide doors of a vehicle.

2. Description of the Related Art

Among wire harnesses that are routed in vehicles are ones that are routed in the vicinities of the doorways of slide doors of vehicles (PTL 1 and 2).

PTL 1 is JP-A-2013-150540 and PTL 2 is JP-A-2013-162716.

SUMMARY OF INVENTION

In a power supply device for a slide structural body disclosed in PTL 1, when the slide structural body (slide door) is opened or closed with respect to a fixed structural body (vehicle body), the slide structural body is moved relative to the fixed structural body while an exterior member (corrugated tube) of a wire harness bends in an S-shape as a whole. Two bends are formed in each of wire harnesses that bend in this manner.

However, in a situation that cables and an exterior member that constitute a wire harness are required to be as short as possible, if two bends are formed in the wire harness, the bending radius of each bend is inevitably made small. Where a wire harness is bent repeatedly that has an exterior member whose design bending radius is set small, the wire harness tends to become lower in bending durability (i.e., smaller in the number of times of bending that is allowable to maintain necessary performance of the wire harness) than a wire harness having an exterior member whose design bending radius is set large. Therefore, from the viewpoint of increasing the bending durability, it is preferable that the design bending radius of an exterior member be set large. On the other hand, where the design bending radius of an exterior member is set large, a space that allows the exterior member to bend at that bending radius needs to be secured on the vehicle side where the wire harness is routed.

The present invention has been made in view of the above circumstances, and an object of the invention is therefore to provide a wire harness capable of minimizing a space that needs to be secured on the vehicle side to allow bending of an exterior member while increasing the design bending radius of the exterior member.

To attain the above object, the wire harness according to the invention is characterized by the following items (1)-(8):

(1) A wire harness including an exterior member one end of which is attached to a slide structural body and the other end of which is attached to a fixed structural body, wherein at least the one end of the exterior member is supported pivotally so as to be rotatable in a horizontal plane about a vertical axis passing through the one end of the exterior member and is urged forward or backward in a closing direction, among a circumference direction around the vertical axis, in which the slide structural body is closed with respect to the fixed structural body so that the exterior member is bendable in a U-shape.

(2) The wire harness according to item (1), wherein the exterior member is supported pivotally at both ends thereof so as to be rotatable in a horizontal plane about vertical axes passing through the both ends, respectively.

(3) The wire harness according to item (1) or (2), further including a slide-structural-body-side power supply tool which pivotally supports the exterior member so as to be rotatable in a horizontal plane about the vertical axis passing through the one end of the exterior member, wherein the slide-structural-body-side power supply tool urges the one end side of the exterior member forward in the closing direction, among the circumference direction around a vertical direction passing through the one end of the exterior member, in which the slide structural body is closed with respect to the fixed structural body.

(4) The wire harness according to item (3), further including a fixed-structural-body-side power supply tool which pivotally supports the exterior member so as to be rotatable in a horizontal plane about a vertical axis passing through the other end of the exterior member, wherein a longest distance between two points, in a direction in which the slide structural body and the fixed structural body are opposed to each other, of the exterior member being bent in the U-shape is greater than an interval between the slide-structural-body-side power supply tool and the fixed-structural-body-side power supply tool.

(5) The wire harness according to item (1), wherein the exterior member is supported pivotally at the one end so as to be rotatable in a horizontal plane about the vertical axis passing through the one end of the exterior member and the exterior member is fixed at the other end so as not to be rotatable in a horizontal plane.

(6) A wire harness including an exterior member one end of which is attached to a slide structural body and the other end of which is attached to a fixed structural body, wherein the exterior member is supported pivotally so as to be rotatable in a horizontal plane about a vertical axis passing through the one end of the exterior member, and the exterior member is supported pivotally so as to be rotatable in a horizontal plane about a vertical axis passing through the other end of the exterior member; and the other end side of the exterior member is urged forward in a closing direction, among a circumference direction around a vertical direction passing through the other end of the exterior member, in which the slide structural body is closed with respect to the fixed structural body so that the exterior member is bendable in a U-shape.

(7) The wire harness according to item (6), further including a fixed-structural-body-side power supply tool which pivotally supports the exterior member so as to be rotatable in a horizontal plane about the vertical axis passing through the other end of the exterior member, wherein the fixed-structural-body-side power supply tool urges the other end side of the exterior member forward in the closing direction, among the circumference direction around a vertical direction passing through the other end of the exterior member, in which the slide structural body is closed with respect to the fixed structural body.

(8) The wire harness according to item (7), further including a slide-structural-body-side power supply tool which pivotally supports the exterior member so as to be rotatable in a horizontal plane about the vertical axis passing through the one end of the exterior member, wherein a longest distance between two points, in a direction in which the slide structural body and the fixed structural body are opposed to each other, of the exterior member being bent in a U-shape is greater than an interval between the slide-structural-body-side power supply tool and the fixed-structural-body-side power supply tool.

In the wire harnesses having the configurations of items (1), (2), and (6), the exterior member of the wire harness is bent substantially in, as a whole, a U-shape that is convex forward in the direction in which the slide structural body is closed with respect to the fixed structural body. The exterior member that is bent in this manner has a larger bending radius than exterior members that are bent in an S-shape. As a result, the bending durability of the wire harness (i.e., the exterior member and plural cables with insulation coverings inserted through it) can be increased.

In the wire harnesses having the configurations of items (3) and (7), the exterior member is urged by the power supply tool. In this case, the power supply tool can be provided as a constituent unit of the wire harness and the wire harness can be implemented as a module.

According to the wire harnesses having the configurations of items (4) and (8), a space that allows bending of the exterior member can be secured while the interval between the slide structural body and the fixed structural body is set short.

According to the wire harness having the configurations of item (5), the attachment structure for the other end, to serve as a fixed end, of the exterior member can be made simpler than that for its one end which is attached so as to be rotatable in a horizontal plane, whereby cost increase due to complication of the attachment structure can be prevented.

The invention can provide a wire harness capable of minimizing a space that needs to be secured on the vehicle side to allow bending of an exterior member while increasing the design bending radius of the exterior member.

The invention has been described above concisely. The details of the invention will become more apparent when the modes for carrying out the invention (hereinafter referred to as embodiments) described below is read through with reference to the accompanying drawings.

DETAILED DESCRIPTION OF THE EXEMPLARY EMBODIMENTS

Specific embodiments of the present invention will be hereinafter described with reference to the drawings.

Embodiment 1

Figure 1A:
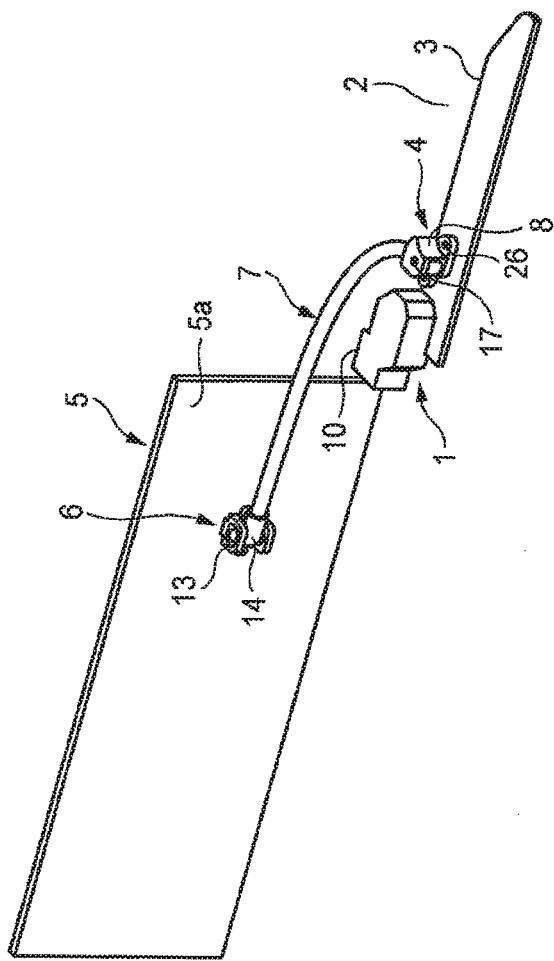
FIGS. 1(a) and 1(b) show a power supply device for a slide structural body using a wire harness according to a first embodiment of the present invention, and are a perspective view and a plan view, respectively, in a state that the slide door is in a full open state.
Figure 1B:
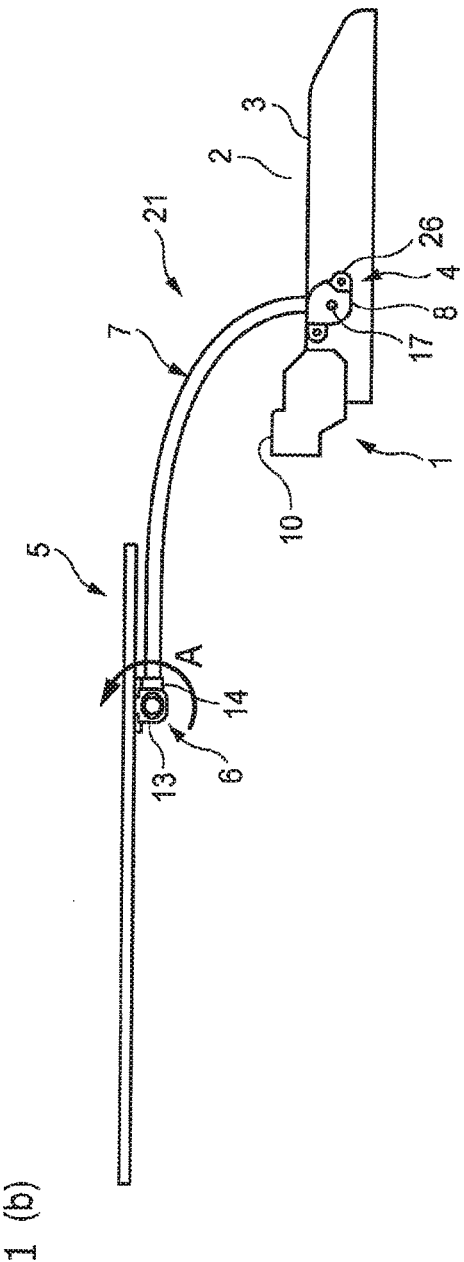
Figure 2:
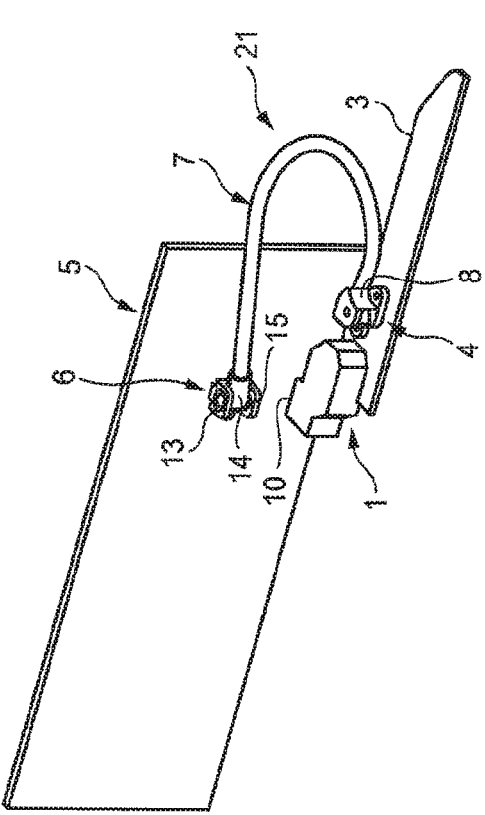
FIGS. 2(a) and 2(b) show the power supply device for a slide structural body using a wire harness according to the first embodiment of the invention, and are a perspective view and a plan view, respectively, in a state that the slide door is in a half-open state.
Figure 2:
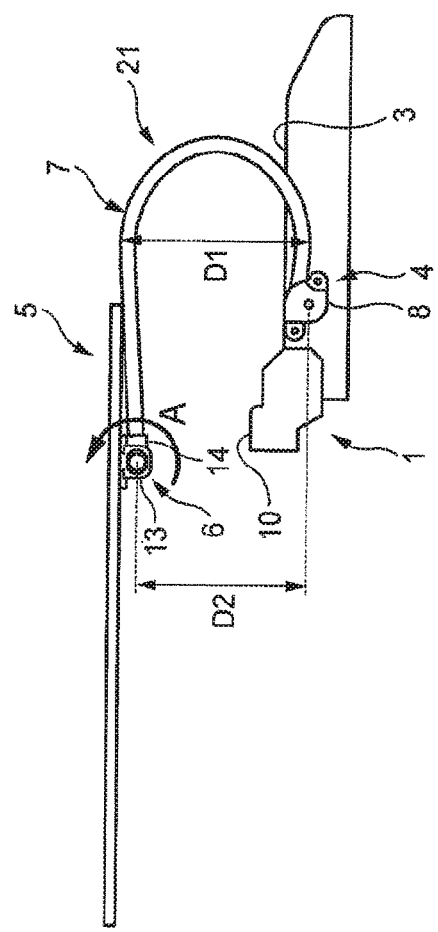
Figure 3A:
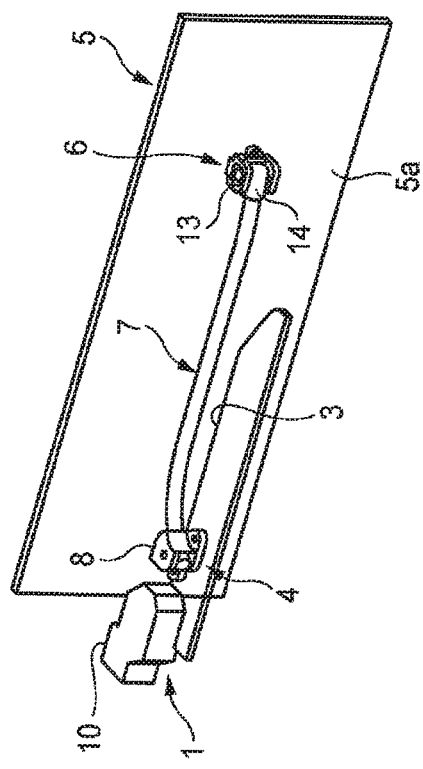
FIGS. 3(a) and 3(b) show the power supply device for a slide structural body using a wire harness according to the first embodiment of the invention, and are a perspective view and a plan view, respectively, in a state that the slide door is in a fully closed state.
Figure 3B:
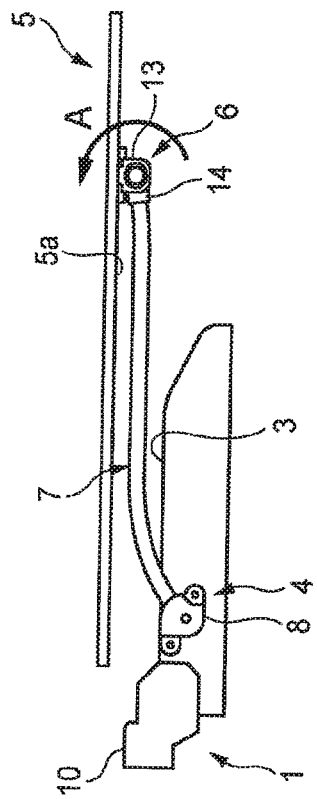

FIGS. 1(a)-3(b) show an power supply device for a slide structural body according to a first embodiment of the invention. FIGS. 1(a) and 1(b) show a state that a left-hand vehicle slide door (slide structural body) of an automobile fully opened. FIGS. 2(a) and 2(b) show a state that the same slide door is opened halfway. FIGS. 3(a) and 3(b) show a state that the same slide door is fully closed.

As shown in FIGS. 1(a)-3(b), to move a slide door 5 from a position where it is fully opened with respect to a vehicle body 1 (see FIGS. 1(a) and 1(b)) to a fully closed position, first the slide door 5 which has been located at the full open position is slide-moved forward (rightward in FIG. 1(b)). Then the slide door 5 that is located at the half-open position (see FIGS. 2(a) and 2(b)) is further slide-moved forward along a guide rail (not shown) provided on the vehicle body 1 side and is thus caused to approach the vehicle body 1. Thus, the slide door 5 reaches the position where it is fully closed with respect to the vehicle body 1 (see FIGS. 3(a) and 3(b)). The slide door 5 can be returned to the position where it is fully opened with respect to the vehicle body 1 by moving it in the opposite direction. Numeral 10 denotes a vehicle body portion.

As shown in FIGS. 1(*a*)-3(*b*), a power supply device 21 for a slide door structural body (slide door) is composed of a vehicle-body-1-side power supply tool 4 which is attached, at a vehicle rear-side position, to, for example, a step 3 of a doorway 2 of a fixed structural body (vehicle body) 1 of the automobile, a slide-door-side power supply tool 6 which is disposed on a metal inner panel 5*a* of the slide door 5 at the same height as the vehicle-body-side power supply tool 4, and a wire harness (also denoted by symbol 7) with a corrugated tube (exterior member or protective tube) 7 which is routed horizontally between the two power supply tools 4 and 6.

The vehicle-body-side power supply tool 4 includes an outer member 8 which is made of a synthetic resin and fixed to the vehicle body and an inner member 9 (see FIGS. 4(*a*)-4(*c*)) which is supported pivotally by the outer member 8 so as to be rotatable (swingable) in a horizontal plane and holds (supports) the other end of the corrugated tube 7 of the wire harness. Equipped with the outer member 8 and the inner member 9, the vehicle-body-side power supply tool 4 supports the corrugated tube 7 pivotally so that the corrugated tube 7 is rotatable in a horizontal plane about the vertical direction that passes through the other end of the corrugated tube 7.

The slide-door-side power supply tool 6 is composed of an outer member 13 which is fixed to the inner panel 5*a* of the slide door 5, an inner member 14 which is supported pivotally by the outer member 13 so as to be rotatable (swingable) in a horizontal plane and holds (supports) the one end portion of the corrugated tube 7 of the wire harness, and a spring member 15 (see FIGS. 7(*a*) and 7(*b*); described later) which supports the inner member 14 toward the vehicle compartment side (vehicle body side). Equipped with the outer member 13 and the inner member 14, the slide-door-side power supply tool 6 supports the corrugated tube 7 pivotally so that the corrugated tube 7 is rotatable in a horizontal plane about the vertical direction that passes through the one end of the corrugated tube 7.

The corrugated tube 7 of the wire harness is urged (pushed) together with the inner member 14 in the direction indicated by arrow A by the urging force of the spring member 15 toward the slide door 5 away from the vehicle body 1. In other words, the slide-door-side power supply tool 6 urges the one end side of the corrugated tube 7 forward in the closing direction, among a circumference direction around the vertical direction passing through the one end of the corrugated tube 7, in which the slide door 5 is closed with respect to the vehicle body 1.

Since the corrugated tube 7 is urged in the above-described manner, when the slide door 5 is moved from the full open state shown in FIGS. 1(*a*) and 1(*b*) to the half-open state shown in FIGS. 2(*a*) and 2(*b*), the corrugated tube 7 of the wire harness is bent substantially in, as a whole, a U-shape that is convex forward in the direction in which the slide door 5 is closed with respect to the vehicle body 1, without suffering buckling or the like. The corrugated tube 7 which is bent in this manner has a larger bending radius than corrugated tubes that are bent in an S-shape. As a result, the bending durability of the wire harness (i.e., the corrugated tube 7 and plural cables with insulation coverings inserted through it) can be increased.

A more specific description will be made below. When the slide door 5 is located at the full open position shown in FIGS. 1(*a*) and 1(*b*), when viewed from the side of its one end located on the slide door side, the corrugated tube 7 of the wire harness extends toward ahead of a closing direction in which the slide door 5 is closed with respect to the vehicle body 1 and in a direction from the slide door 5 toward the vehicle body 1. This is because its one end located on the slide door side is urged in the direction indicated by arrow A by the urging force of the spring member 15. In this state, because of its own rigidity, the other end, located on the vehicle body side, of the corrugated tube 7 is held by the vehicle-body-side power supply tool 4 in a state that it has been rotated backward in the closing direction. As a result, the other end, located on the vehicle body side, of the corrugated tube 7 of the wire harness extends in the arrangement direction of the slide door 5 and the vehicle body 1.

Furthermore, when the slide door 5 is located at the half-open position shown in FIGS. 2(*a*) and 2(*b*), when viewed from the side of its one end located on the slide door side, the corrugated tube 7 of the wire harness extends forward in the closing direction in which the slide door 5 is closed with respect to the vehicle body 1. This is because its one end located on the slide door side is urged in the direction indicated by arrow A by the urging force of the spring member 15. In this state, because of its own rigidity, the other end, located on the vehicle body side, of the corrugated tube 7 is held by the vehicle-body-side power supply tool 4 in a state that it is rotated forward in the closing direction. As a result, when viewed from the side of its other end located on the vehicle body side, the corrugated tube 7 of the wire harness extends forward in the closing direction in which the slide door 5 is closed with respect to the vehicle body 1. An intermediate portion of the corrugated tube 7 of the wire harness whose one end and other end extend forward in the closing direction of the slide door 5 extends in the arrangement direction of the slide door 5 and the vehicle body 1. Thus, when the slide door 5 is located at the half-open position, the corrugated tube 7 of the wire harness is substantially, as a whole, in a U-shape convexed forward in the direction in which the slide door 5 is closed with respect to the vehicle body 1.

Still further, when the slide door 5 is located at the fully closed position shown in FIGS. 3(*a*) and 3(*b*), when viewed from the side of its one end located on the slide door side, the corrugated tube 7 of the wire harness extends backward in the closing direction in which the slide door 5 is closed with respect to the vehicle body 1 and in the direction from the slide door 5 toward the vehicle body 1. When viewed from the side of its one end located on the slide door side, the corrugated tube 7 is located backward in the closing direction of the slide door 5, because its one end located on the slide door side is urged in the direction indicated by arrow A by the urging force of the spring member 15 but tension that surpasses the urging force acts on its one end located on the slide door side. In this state, because of its own rigidity, the other end, located on the vehicle body side, of the corrugated tube 7 is held by the vehicle-body-side power supply tool 4 in a state that it is rotated forward in the closing direction. As a result, the corrugated tube 7 of the wire harness extends straightly in the direction in which the slide door 5 is closed with respect to the vehicle body 1.

A description of how the power supply device 21 works in the case that the slide door 5 is moved from the fully closed state shown in FIGS. 3(*a*) and 3(*b*) to the half-open state shown in FIGS. 2(*a*) and 2(*b*) or from the half-open state shown in FIGS. 2(*a*) and 2(*b*) to the full open state shown in FIGS. 1(*a*) and 1(*b*) is omitted because in this case the power supply device 21 works oppositely to the manner the slide door 5 is moved from the half-open state to the fully closed state or from the full open state to the half-open state.

Next, the vehicle-body-side power supply tool 4 will be described in detail. FIGS. 4(a)-6(b) show the vehicle-body-side power supply tool employed in the first embodiment.

Figure 4A:
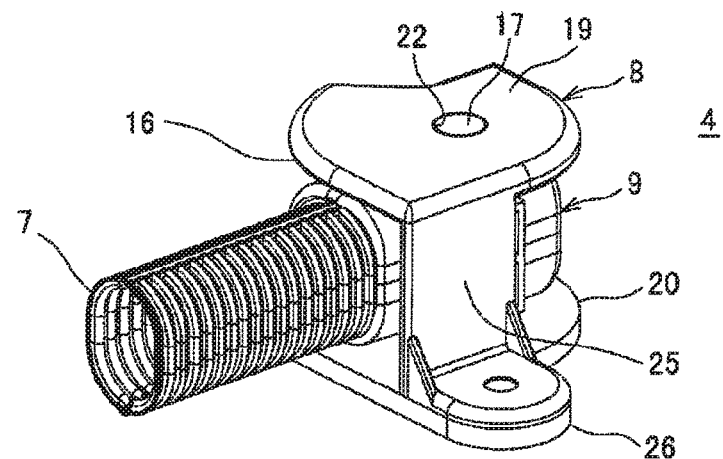
FIGS. 4(a)-4(c) are perspective views as viewed from different directions showing a vehicle-body-side power supply tool employed in the first embodiment in different states of operation.
Figure 4B:
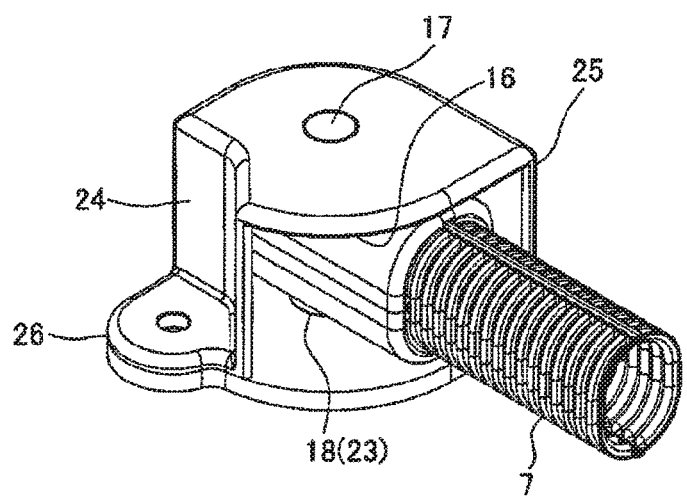
Figure 4C:
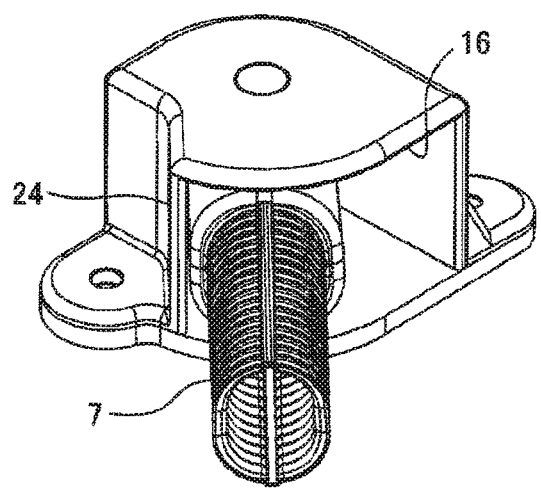

As shown in FIGS. 4(a)-4(c), the vehicle-body-side power supply tool 4 is equipped with the outer member 8 which is made of a synthetic resin and shaped like a case and the inner member 9 made of a synthetic resin. The outer member 8 has an opening 16 which is fan-shaped in a horizontal plane. The inner member 9 is rotated (swung) together with the corrugated tube 7 along the fan-shaped opening 16. In this manner, the corrugated tube 7 which is made of a synthetic resin projects through the opening 16 of the vehicle-body-side power supply tool 4 and supported pivotally so as to be rotatable (swingable) in a horizontal plane.

Top and bottom, short-cylinder-shaped shafts 17 and 18 are inserted in circular holes 22 and 23 of top and bottom, horizontal walls 19 and 20 of the outer member 8, respectively, whereby the inner member 9 is supported rotatably. The inner member 9 is housed rotatably in a space that is defined by the top and bottom horizontal walls 19 and 20 and front and rear vertical walls 24 and 25 of the outer member 8. The front wall 24 is bent substantially in a V-shape (wide-angled V-shape) in a plan view and to thereby make the opening 16 wide, and the fan-shaped opening 16 is formed by one edges (left-side edges) of the top, bottom, right, and left walls 19, 20, 24, and 25. Horizontal, brim-like brackets 26 for fixing to the vehicle body which are laid on each other are provided on the bottom edges of the front and rear walls 24 and 25 and the bottom wall 20 of the outer member 8.

Figure 5:
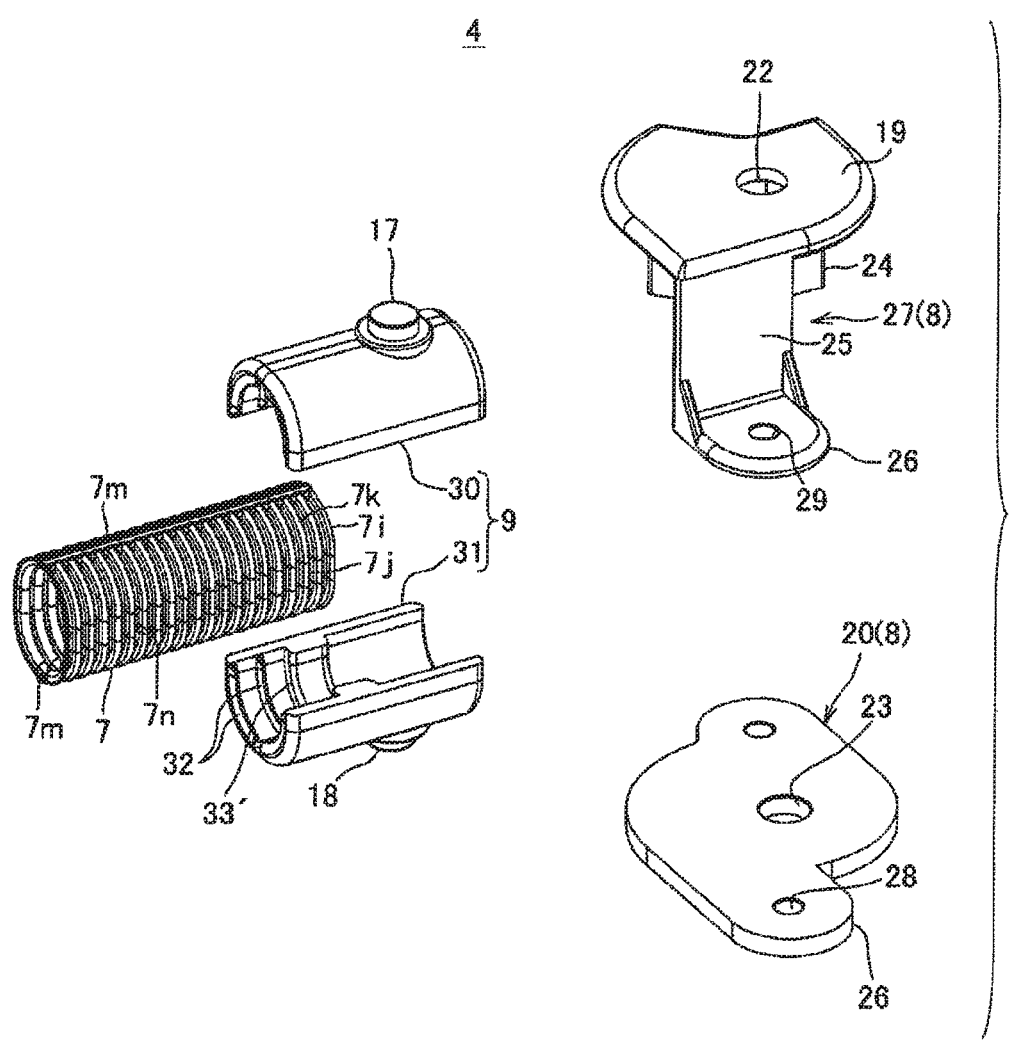
FIG. 5 is an exploded perspective view of the vehicle-body-side power supply tool employed in the first embodiment.

FIG. 5 is an exploded view of the vehicle-body-side power supply tool 4 employed in the first embodiment. The outer member 8 and the inner member 9 are separate bodies, and constitute the vehicle-body-side power supply tool 4 shown in FIG. 4(a) when assembled.

The outer member 8 is composed of a bottom, horizontal, plate-like base wall (bottom wall) 20 and a wall member 27 which is approximately concave downward in a vertical sectional view and is fixed to the base wall 20. The base wall 20 and the wall member 27 are locked on each other by a locking means (not shown). For example, the locking means (locking unit) is composed of lock nails that are erected from the base wall 20 and lock holes formed in the front and rear walls 24 and 25 of the wall member 27.

The base wall 20 has brackets 26 having front and rear, small circular holes 28, respectively, and a central, large hole 23 for shaft supporting. The wall member 27 is composed of a horizontal top wall 19, front and rear vertical walls 24 and 25, and brackets 26 which project like brims from the bottom edges of the front and rear walls 24 and 25, respectively. The brackets 26 have small circular holes 29 which are opposed to the respective circular holes 28 of the base wall 20, and the top wall 19 has a large hole 22 for shaft supporting which is opposed to the central hole 23 of the base wall 20.

The inner member 9, which is of a vertical separation type, is composed of a pair of (top and bottom) semi-ring-shaped (semi-cylindrical) divisional inner members 30 and 31 which are joined to each other into a ring shape (cylindrical shape) by a locking means (not shown). The outer surfaces of the divisional inner members 30 and 31 are formed with top and bottom shafts 17 and 18, respectively, and each of their inner surfaces is formed with ribs 32 for corrugated tube holding (supporting) and a stopper projection strip 33' to contact one end 7i of the corrugated tube 7.

For example, the locking means (locking unit) of the inner member 9 is consists of lock nails that are formed on the dividing surfaces of the one divisional inner member 30 and lock holes that are formed in the dividing surfaces of the other divisional inner member 31. The ribs 32 are engaged with respective circumferential valleys (concave grooves) 7j of the corrugated tube 7.

The corrugated tube 7, which is of an existing type, is configured in such a manner that circumferential valleys (concave grooves) 7j and mountains (projection strips) 7k are arranged alternately in the tube longitudinal direction, and assumes, in a sectional view, an elliptical shape that is longer in the vertical direction. The top and bottom ends (i.e., the ends in the longer-axis direction) of the corrugated tube 7 are formed with respective ribs 7m for suppressing its bending in the vertical direction which are continuous in the longitudinal direction. Therefore, the corrugated tube 7 is highly bendable in the shorter-axis direction. Plural cables (not shown) are inserted through the corrugated tube 7. And cable portions leading through the end 7i of the corrugated tube 7 pass through the inside space of the inner member 9, lead out of it, and are connected, by a connector or the like, to a wire harness (not shown) that is provided on the vehicle body 1 side (power source side; see FIG. 1).

For example, another structure is possible in which the top wall 19 and the bottom wall 20 are formed with shafts 17 and 18 for rotation of the inner member 9 of the vehicle-body-side power supply tool 4 and the top and bottom walls of the inner member 9 are formed with holes 22 and 23 or holes having a closed bottom (recesses) for engagement with the shafts 17 and 18, respectively.

Figure 6B:
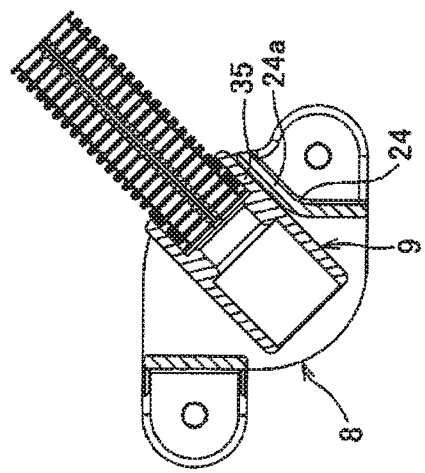
FIGS. 6(a) and 6(b) are horizontal sectional views showing how the vehicle-body-side power supply tool works.
Figure 6A:
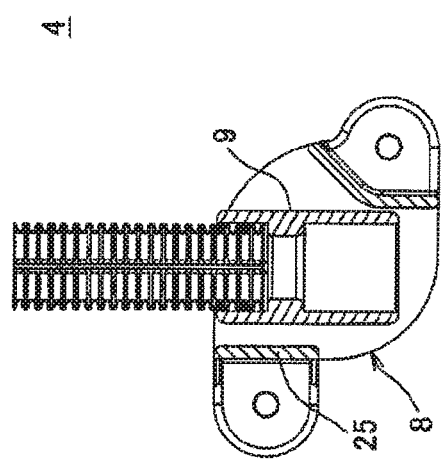

FIGS. 6(a) and 6(b) are horizontal sectional views of the vehicle-body-side power supply tool 4. FIGS. 6(a) and 6(b) correspond to FIGS. 4(b) and 4(c), respectively.

As shown in FIG. 6(a), when the inner member 9 is rotated counterclockwise, it comes into contact with the rear wall 25 of the outer member 8 and is prevented from rotating rearward further. On the other hand, as shown in FIG. 6(b), when the inner member 9 is rotated clockwise, the outer surface of a front wall 35 of the inner member 9 comes into contact with the inner surface of a left half slant portion 24a of the front wall 24 substantially expands in a V-shape in a plan view of the outer member 8 on the front side and is prevented from rotating forward further.

Next, the slide-door-side power supply tool 6 will be described in detail. FIGS. 7(a)-9(b) show the slide-door-side power supply tool 6 employed in the first embodiment. FIGS. 7(a) and 9(a) correspond to the case that the slide door 5 is in the full open state (see FIG. 1), and FIGS. 7(b) and 9(b) correspond to the case that the slide door 5 is in the fully closed state (see FIG. 3). FIG. 8 is an exploded view corresponding to FIG. 7(a).

Figure 7B:
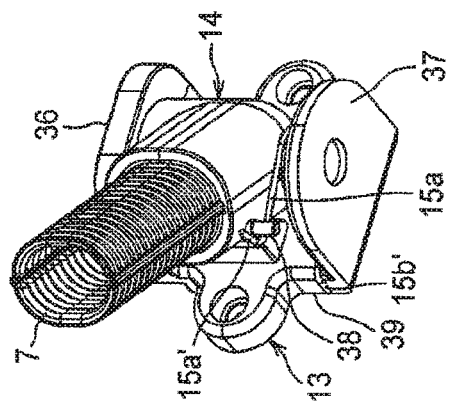
FIGS. 7(a) and 7(b) are perspective views of a slide-door-side power supply tool employed in the first embodiment.
Figure 7A:
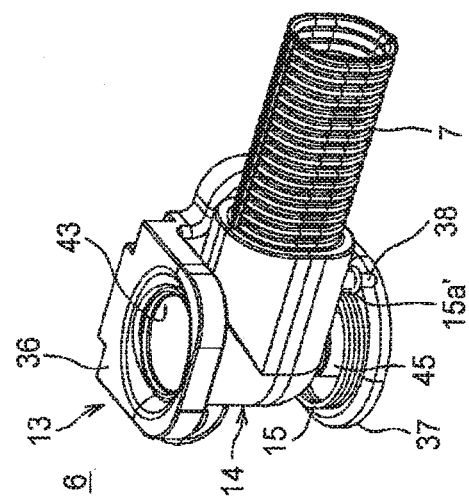
Figure 8:
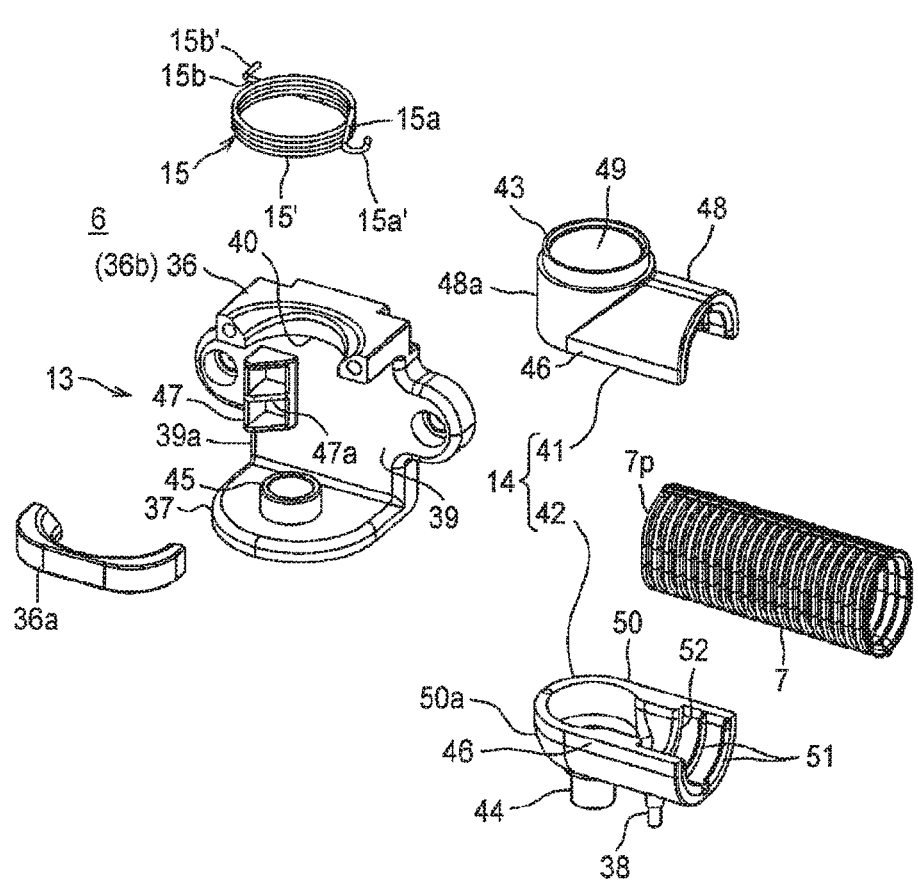
FIG. 8 is an exploded perspective view of the slide-door-side power supply tool.

As shown in FIGS. 7(a) and 7(b), the slide-door-side power supply tool 6 is composed of an outer member 13 which approximately assumes a square bracket shape in a vertical sectional view and is fixed to the slide door 5 (see FIG. 1), an inner member 14 which is supported pivotally between top and bottom horizontal walls 36 and 37 of the outer member 13 so as to be rotatable (swingable) in a horizontal plane and holds (supports) the one end of the corrugated tube 7 of the wire harness, and a spring member 15 which urges the inner member 14 clockwise so as to direct it toward the vehicle rear side.

The spring member 15 which is a torsion coil spring is disposed parallel with the bottom wall 37 of the outer member 13. A hook 15a' which extends from the tip of one straight pin portion 15a (located on the upper side in FIG. 7(b)) of the torsion coil spring 15 is engaged with, from inside, a pin 38 which projects from the bottom outer surface of the inner member 14. A hook 15b' which extends from the tip of the other straight pin portion (located on the lower side in FIG. 7(b)) of the torsion coil spring 15 is engaged with a front surface of a vertical wall 39 which links the top and bottom walls 36 and 37 of the outer member 13. In this manner, the inner member 14 is urged forward in the closing direction in which the slide door 5 is closed with respect to the vehicle body 1; that is, the inner member 14 is urged in such a direction as to be rotated from a state that it is directed rearward (see FIG. 7(b)) to a state that it is directed forward (see FIG. 7(a)).

As shown in FIG. 8, the horizontal top wall 36 of the outer member 13 is dividable in half by a line that passes through the center of a circular harness insertion hole portion 40. In a state that the wall 36 is divided, a top ring-shaped (cylindrical) shaft 43 of the inner member 14 is engaged with the hole portion (bearing portion) 40, and a bottom cylindrical (solid) shaft 44 of the inner member 14 is engaged with a cylindrical bearing portion 45 of the bottom wall 37 of the outer member 13 from inside. Then a top, divided, semi-ring-shaped divisional wall portion 36a is locked on a top, fixed wall portion 36b by a locking means. For example, the locking means consists of lock holes that are formed on the fixed wall portion 36b side and lock nails that are formed on the divisional wall portion 36a.

A stopper projection 47 which is approximately triangular in a horizontal sectional view and serves to stop rotation of the inner member 14 because one side wall 46 of the inner member 14 comes into contact with it projects from the inner surface of the vertical wall 39 of the outer member 13 at a left end position. The stopper projection 47 has a slant surface 47a which faces the vehicle front side.

The torsion coil spring 15 is disposed on the top surface of the bottom wall 37 around the bottom bearing portion 45 of the outer member 13. The hook 15a' which extends from the tip of the one (upper) pin portion 15a of the torsion coil spring 15 is locked on the pin 38 which projects downward from a bottom divisional inner member 42 of the inner member 14. The hook 15b' which extends from the other (lower) pin portion 15b is locked on the side end surface 39a of the vertical wall 39 of the outer member 13. The torsion coil spring 15 is composed of a clockwise coil winding 15', the one pin portion 15a which extends from the top turn of the coil winding 15', and the other pin portion 15b which extends from the bottom turn of the coil winding 15'.

The inner member 14 is composed of top and bottom divisional inner members 41 and 42. The top divisional inner member 41 has a horizontal, semi-cylindrical wall 48 which is closed on the base portion 48a side, a circular hole 49 which is disposed on the base side and has a top opening, and a ring-shaped shaft 43 which is formed around the hole 49. The bottom divisional inner member 42 a horizontal, semi-cylindrical wall 50 which is closed on the base portion 50a side, a shaft 44 which projects downward on the base side, and a spring locking pin 38 which projects downward on the tip side. Each of the semi-cylindrical walls 48 and 50 has circumferential ribs 51 for corrugated tube locking and a stopper step 52 to contact the other end 7p of the corrugated tube 7.

The semi-cylindrical walls 48 and 50 are cylindrical walls that are locked on each other by a locking means. For example, the locking means consists of lock nails that project formed on the dividing surfaces of the one semi-cylindrical wall 48 and lock holes that are formed in the dividing surfaces of the other semi-cylindrical wall 50. Although the corrugated tube 7 is drawn in the drawings as if to be short, actually it extends long from the tips of the semi-cylindrical walls 48 and 50.

For example, another structure is possible in which the bottom shaft 44 of the inner member 14 of the slide-door-side power supply tool 6 is removed and the bottom wall of the inner member 14 is formed with a hole (not shown) or a hole having a closed bottom (recess; not shown) for engagement with a cylindrical (tubular or solid) bearing portion 45 of the outer member 13. Still another structure is possible in which the top, ring-shaped shaft 43 of the inner member 14 is removed, a small rib (projection) that is arc-shaped in a plan view projects upward from the top semi-cylindrical wall 48 of the inner member 14, and the top wall 36 of the outer member 13 is formed with a groove (not shown) that is arc-shaped (approximately semi-circular) in a plan view and is engaged with the rib, coaxially with the bottom bearing portion 45.

As shown in FIG. 9(a), when the slide door 5 is in the full open state (see FIGS. 1(a) and 1(b)), the inner member 14 of the slide-door-side power supply tool 6 is directed forward in the closing direction in which the slide door 5 is closed with respect to the vehicle body 1. In this state, the slant surface 47a of the stopper projection 47 of the outer member 13 is located close to the outer surface of the base portion 48a (50a) of the inner member 14.

Figure 9B:
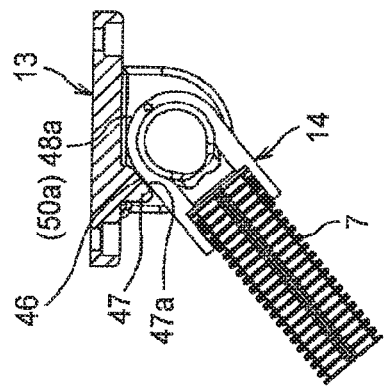
FIGS. 9(a) and 9(b) are horizontal sectional views showing how the slide-door-side power supply tool works.
Figure 9A:
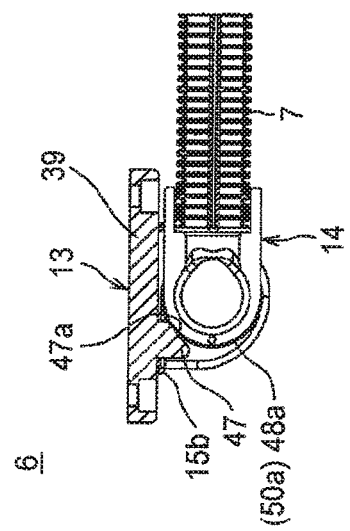

On the other hand, as shown in FIG. 9(b), when the slide door 5 is in the fully closed state (see FIGS. 3(a) and 3(b)), a portion, close to the base portion 48a (50a), of one side wall 46 of the inner member 14 of the slide-door-side power supply tool 6 is in contact with the slant surface 47a of the stopper projection 47 of the outer member 13, whereby the inner member 14 is prevented from rotating clockwise further. As a result, the inner member 14 and the corrugated tube 7 of the wire harness are placed so as to be inclined obliquely rearward and toward the vehicle inside.

As described above, in the configuration according to the first embodiment, in a process that the slide door 5 is moved from the full open position to the fully closed position or from the fully closed position to the full open position, the inner member 14 of the slide-door-side power supply tool 6 and the corrugated tube 7 of the wire harness are urged in the direction indicated by arrow A in FIG. 1. As a result, the corrugated tube 7 of the wire harness is bent substantially in, as a whole, a U-shape that is convex forward in the direction in which the slide door 5 is closed with respect to the vehicle body 1. The corrugated tube 7 which is bent in this manner has a larger bending radius than corrugated tubes that are bent in an S-shape. As a result, the bending durability of the wire harness (i.e., the corrugated tube 7 and plural cables with insulation coverings inserted through it) can be increased.

In the configuration according to the first embodiment, a space in which the corrugated tube 7 is bendable in a U-shape is secured in front of the vehicle-body-side power supply tool 4 in the direction in which the slide door 5 is closed with respect to the vehicle body 1. This space belongs to a space of the doorway 2 of the vehicle body 1. However, this space is not used while the slide door 5 is moved to establish the full open state or the fully closed state though it is used for passengers to get on or off when the slide door 5 is in the full open state. Therefore, part of the space of the doorway 2 of the vehicle body 1 can be used as a space where the corrugated tube 7 is in a U-shape when bent. As a result, it is not necessary to add, in the vehicle, a new space where the corrugated tube 7 is to bend in a U-shape. Furthermore, since such a space is secured, the bending radius that the corrugated tube 7 is to have when bent can be set large in designing, which makes it possible to increase the bending durability of the wire harness further.

Since a space where the corrugated tube 7 is to bend in a U-shape is secured in the above-described manner, the interval between the vehicle-body-side power supply tool 4 and the slide-door-side power supply tool 6 can be set smaller than in conventional cases. More specifically, referring to FIG. 2(*b*), the longest distance D1 between the two points, in the direction in which the slide door 5 and the vehicle body 1 are opposed to each other, of the corrugated tube 7 being bent in a U-shape can be set, in designing, greater than the interval D2 between the vehicle-body-side power supply tool 4 and the slide-door-side power supply tool 6. This makes it possible to secure a space where the corrugated tube 7 is in a U-shape when bent while shortening the interval between the slide door 5 and the vehicle body 1.

In the configuration according to the first embodiment in which the slide-door-side power supply tool 6 is equipped with the urging means, the vehicle-body-side power supply tool 4 need not always be equipped with an urging means. It suffices that the vehicle-body-side power supply tool 4 be equipped with only the mechanism for pivotally supporting the corrugated tube 7 so that it is rotatable in a horizontal plane. Therefore, the vehicle-body-side power supply tool 4 can be reduced in size.

In the configuration according to the first embodiment, the urging force of the spring member 15 that acts on the corrugated tube 7 is strongest when the slide door 5 is located at the fully closed state. While the vehicle is traveling, this urging force acting on the corrugated tube 7 held by the inner member 14 is balanced with the tension acting on it from the vehicle-body-side power supply tool 4. In this state in which the external forces are balanced with each other, vibration of the corrugated tube 7 is suppressed. Furthermore, even if the corrugated tube 7 has an excess length, the urging force is balanced with the tension acting from the vehicle-body-side power supply tool 4 in a state that the corrugated tube 7 has been rotated by an amount corresponding to the excess length. Therefore, the slide-door-side power supply tool 6 functions as a mechanism for absorbing an excess length. The wire harness whose excess length has been absorbed in this manner is suppressed in vibration while the vehicle is traveling.

In the configuration according to the first embodiment, when the slide door 5 is located at the fully closed position, the corrugated tube 7 of the wire harness becomes in a straight shape extending in the direction in which the slide door 5 is closed with respect to the vehicle body 1. Therefore, by covering the wire harness from above by, for example, providing the slide door 5 with a trim, the line of sight that is directed to the wire harness can be interrupted by the trim. In this manner, a structure for making the wire harness hard to see can be realized easily.

Embodiment 2

Figure 10:
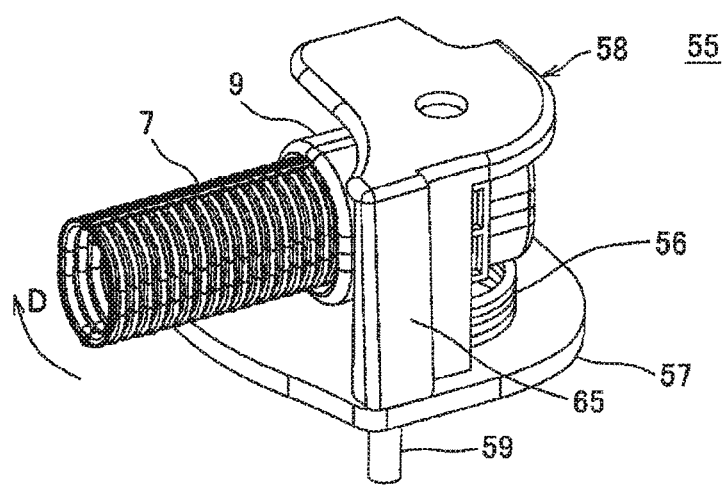
FIG. 10 is a perspective view of a vehicle-body-side power supply tool employed in a second embodiment.
Figure 11:
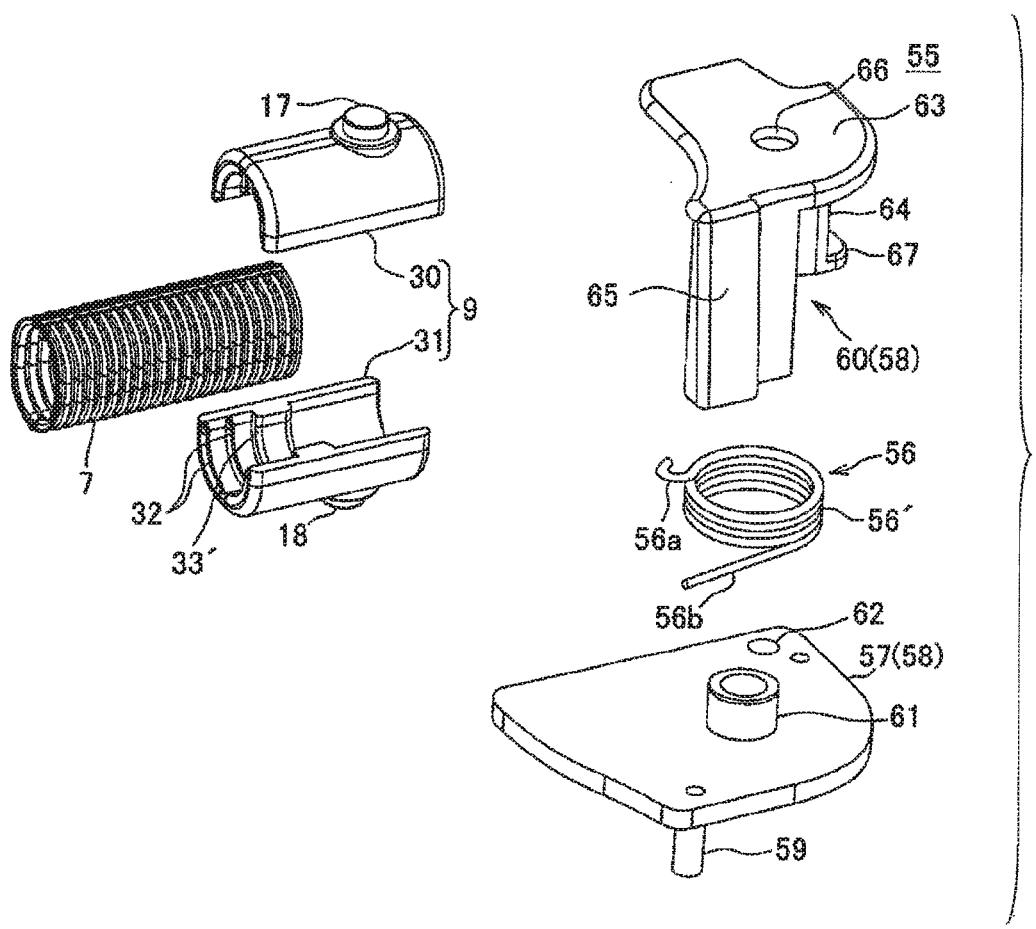
FIG. 11 is an exploded perspective view of the vehicle-body-side power supply tool employed in the second embodiment.
Figure 12A:
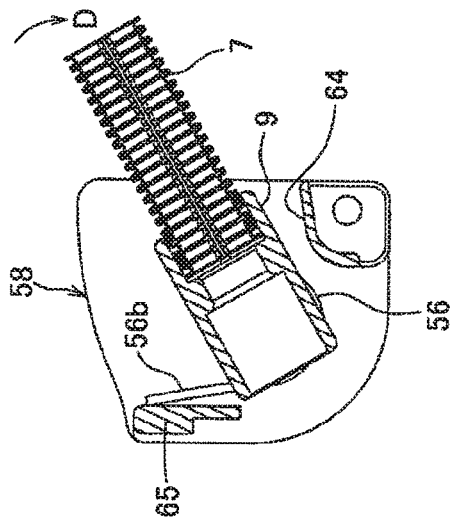
FIGS. 12(a) and 12(b) are horizontal sectional views showing how the vehicle-body-side power supply tool employed in the second embodiment works.

FIGS. 10-12(*b*) show a vehicle-body-side power supply tool employed in a second embodiment. This vehicle-body-side power supply tool 55 is characterized in that it is equipped with a torsion coil spring 56 and an inner member 9 is urged, by the urging force of the spring member 56, together with the corrugated tube 7 of the wire harness, in the direction indicated by arrow D in FIG. 10 so as to be directed to the vehicle front side. Constituent members having the same ones in FIGS. 4 and 5 (first embodiment) will be given the same symbols as the latter, and detailed descriptions therefor will not be omitted.

As shown in FIG. 10, the vehicle-body-side power supply tool 55 is composed of an outer member 58 which is made of a synthetic resin and is positioned with respect to the vehicle body 1 by a pin 59 projecting downward from a base wall (bottom horizontal wall) 57 and fixed to it by, for example, bolt fastening, an inner member 9 which is made of a synthetic resin, is supported pivotally by the outer member 58 so as to be rotatable in a horizontal plane, and holds (supports) one end of the corrugated tube 7 of the wire harness, and the spring member (torsion coil spring) 56 which is made of a metal and urges the inner member 9 clockwise (in the direction indicated by arrow D in FIG. 10) so that the inner member 9 is directed to the vehicle front side. The spring member 56 is disposed between the base wall 57 of the outer member 58 and the inner member 9.

As shown in FIG. 11, the outer member 58 is composed of the horizontal base wall 57 and a wall member 60 which is concave downward in a vertical sectional view and is fixed to the base wall 57 by a locking means. In the base wall 57, the positioning pin 59 for positioning with respect to the vehicle body projects from the bottom surface at a rear end position, a cylindrical bearing portion 61 projects from the top surface at an approximately central position, and a bolt insertion hole 62 for fixing is formed at a front end position. The wall member 60 has a top horizontal wall 63 and front and rear vertical walls 64 and 65. The top wall 63 has a bearing hole 66, and the front wall 64 has, at the bottom end, a projection 67 which has a hole that is continuous with the bolt insertion hole 62 of the base wall 57. The base wall 57 and the wall member 60 are locked on each other by a locking means (e.g., lock holes and lock nails; not shown).

As in the first embodiment, the inner member 9 is composed of top and bottom divisional inner members 30 and 31. The outer surfaces of the divisional inner members 30 and 31 are formed with top and bottom shafts 17 and 18, respectively, and the inner surface of each of the divisional inner members 30 and is formed with ribs 32 for corrugated tube holding (supporting) and a stopper projection 33' to contact the corrugated tube.

The torsion coil spring 56 is composed of a clockwise coil winding 56', one (front) pin portion 56*a* which extends from the top turn of the coil winding 56' and is bent like a hook, and the other (rear) pin portion 56*b* which extends from the bottom turn of the coil winding 56'. The torsion coil spring 56 is disposed around the bearing portion 61 of the base wall 57. The one pin portion 56*a* is locked on the inner member 9 and the other pin portion 56*b* is locked on the outer member 58.

As shown in FIGS. 12(*a*) and 12(*b*), the rear pin portion 56*b* of the torsion coil spring 56 is in elastic contact with the inner surface of the rear wall 65 of the outer member 58 and the front pin portion 56*a* is locked on, for example, a pin (not shown) that projects from the bottom surface of the inner member 9. FIG. 12(*a*) corresponds to the case that the slide door 5 is in the full open position (see FIGS. 1(*a*) and 1(*b*)). More specifically, FIG. 12(*a*) shows a state that the inner member 9 has been pulled by the corrugated tube 7 of the wire harness against the urging force of the torsion coil spring 56 and thereby rotated together with the corrugated tube 7 so as to be directed backward in the closing direction in which the slide door 5 is closed with respect to the vehicle body 1, whereby the inner member 9 is in contact with the inner surface of the rear wall 65 of the outer member 58 and hence is prevented from rotating further.

Figure 12B:
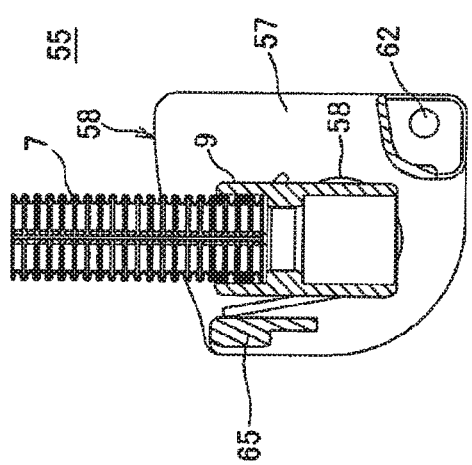

FIG. 12(b) corresponds to the case that the slide door 5 is in the half-open position (see FIGS. 2(a) and 2(b)) and the state that the slide door 5 is in the fully closed position (see FIGS. 3(a) and 3(b)). More specifically, FIG. 12(b) shows a state that the inner member 9 has been rotated clockwise together with the corrugated tube 7 of the wire harness by the urging force of the torsion coil spring 56 so as to be directed forward in the closing direction in which the slide door 5 is closed with respect to the vehicle body 1. In this example, when the inner member 9 is located at the rotation position shown in FIG. 12(b), the urging force of the torsion coil spring 56 almost disappears and further rotation of the inner member 9 in the direction indicated by arrow D is prevented by the reaction force of the torsion coil spring 56. Therefore, the outer member 58 need not be provided with a stopper (like the one denoted by symbol 24 in FIG. 4(c)) for stopping the inner member 9. On the other hand, the front wall 64 of the outer member 58 serves as a stopper for preventing excessive rotation of the inner member 9 in the direction indicated by arrow D.

For example, another structure is possible in which a top shaft 17 for rotation of the inner member 9 of the vehicle-body-side power supply tool 55 shown in FIG. 11 projects from the wall 63 of the outer member 58 and a bottom shaft 18 for the same purpose is formed so as to be integral with the large-diameter bearing portion 61 of the base wall 57 of the outer member 58 and to form a step and the top and bottom walls of the inner member 9 are formed with holes 22 and 23 or holes having a closed bottom (recesses) for engagement with the shafts 17 and 18, respectively.

The spring force of the spring member (torsion coil spring) 56 of the vehicle-body-side power supply tool 55 shown in FIGS. 10-12(b) is set equivalent to or stronger than that of the spring member (torsion coil spring) 15 of the slide-door-side power supply tool 6 shown in FIG. 7(a)-8. It is preferable that the spring force of the torsion coil spring 56 be set stronger than that of the torsion coil spring 15 (i.e., the spring force of the torsion coil spring 15 be set weaker than that of the torsion coil spring 56).

In the above-described configuration according to the second embodiment, in a process that the slide door 5 is moved from the full open position to the fully closed position or from the fully closed position to the full open position, the inner member 14 of the slide-door-side power supply tool 6 and the corrugated tube 7 of the wire harness are urged in the direction indicated by arrow A in FIG. 1. In addition, the inner member 9 of the vehicle-body-side power supply tool 4 and the corrugated tube 7 of the wire harness are urged in the direction indicated by arrow D in FIG. 12. As a result, the corrugated tube 7 of the wire harness is bent substantially in, as a whole, a U-shape that is convex forward in the direction in which the slide door 5 is closed with respect to the vehicle body 1. The corrugated tube 7 (of the wire harness) both ends of which are urged is more easily bent in a U-shape than that of the configuration according to the first embodiment. The corrugated tube 7 which is bent in this manner has a larger bending radius than corrugated tubes that are bent in an S-shape. As a result, the bending durability of the wire harness (i.e., the corrugated tube 7 and plural cables with insulation coverings inserted through it) can be increased.

In the configuration according to the second embodiment, a space in which the corrugated tube 7 is bendable in a U-shape is secured in front of the vehicle-body-side power supply tool 4 in the direction in which the slide door 5 is closed with respect to the vehicle body 1. This space belongs to a space of the doorway 2 of the vehicle body 1. However, this space is not used while the slide door 5 is moved to establish the full open state or the fully closed state though it is used for passengers to get on or off when the slide door 5 is in the full open state. Therefore, part of the space of the doorway 2 of the vehicle body 1 can be used as a space where the corrugated tube 7 is in a U-shape when bent. As a result, it is not necessary to add, in the vehicle, a new space where the corrugated tube 7 is to bend in a U-shape. Furthermore, since such a space is secured, the bending radius that the corrugated tube 7 is to have when bent can be set large in designing, which makes it possible to increase the bending durability of the wire harness further.

Since a space where the corrugated tube 7 is to bend in a U-shape is secured in the above-described manner, the interval between the vehicle-body-side power supply tool 4 and the slide-door-side power supply tool 6 can be set smaller than in conventional cases. More specifically, referring to FIG. 2(b), the longest distance D1 between the two points, in the direction in which the slide door 5 and the vehicle body 1 are opposed to each other, of the corrugated tube 7 being bent in a U-shape can be set, in designing, greater than the interval D2 between the vehicle-body-side power supply tool 4 and the slide-door-side power supply tool 6. This makes it possible to secure a space where the corrugated tube 7 is in a U-shape when bent while shortening the interval between the slide door 5 and the vehicle body 1.

In the configuration according to the second embodiment in which the vehicle-body-side power supply tool 4 is equipped with the urging means, the slide-door-side power supply tool 6 need not always be equipped with an urging means. Where the slide-door-side power supply tool 6 is not equipped with any urging means, it suffices that the slide-door-side power supply tool 6 be equipped with only the mechanism for pivotally supporting the corrugated tube 7 so that it is rotatable in a horizontal plane. Therefore, where the vehicle-body-side power supply tool 4 is equipped with the urging means, the slide-door-side power supply tool 6 can be reduced in size.

In the configuration according to the second embodiment, when the slide door 5 is located at the fully closed position, the corrugated tube 7 of the wire harness assumes a straight shape extending in the direction in which the slide door 5 is closed with respect to the vehicle body 1. Therefore, by covering the wire harness from above by, for example, providing the slide door 5 with a trim, the line of sight that is directed to the wire harness can be interrupted by the trim. In this manner, a structure for making the wire harness hard to see can be realized easily.

Although each of the above embodiments is an example that uses the corrugated tube 7, it is possible to use an existing caterpillar-like exterior member (not shown) in place of the corrugated tube 7. For example, the caterpillar-like exterior member is configured in such a manner that plural (a large number of) approximately rectangular-cylinder-shaped hollow joint members are connected to each other bendably using shafts and holes. Each joint member has top and bottom vertical shafts on the tip side and has vertical holes on the base side. A wire harness is formed by inserting plural cables through the inside spaces of the respective joint members. The top and bottom vertical shafts of the joint member at the one end of the caterpillar-like exterior member are engaged with top and bottom holes formed in the inner surfaces of the horizontal cylindrical walls (harness introducing portions) of the inner member 9 or 14 of the vehicle-body-side or slide-door-side power supply tool 4, 6, or 55 and the top and bottom holes of the joint member at the other end of the caterpillar-like exterior member are engaged with top and bottom shafts projecting from the inner surfaces of the horizontal cylindrical walls (harness introducing portions) of the inner member 9 or 14 of the slide-door-side or vehicle-body-side power supply tool 4, 6, or 55, whereby each end of the caterpillar-like exterior member is connected to the power supply tool 4, 6, or 55.

Of the above embodiments, the first embodiment is directed to the configuration in which the slide-door-side power supply tool 6 is equipped with the urging means and the second embodiment directed to the configuration in which the vehicle-body-side power supply tool 4 and the slide-door-side power supply tool 6 are both equipped with the urging means. Another embodiment is possible in which the vehicle-body-side power supply tool 4 is equipped with the urging means. Even this embodiment provides the same advantages as the first and second embodiments.

Embodiment 3

Figure 13A:
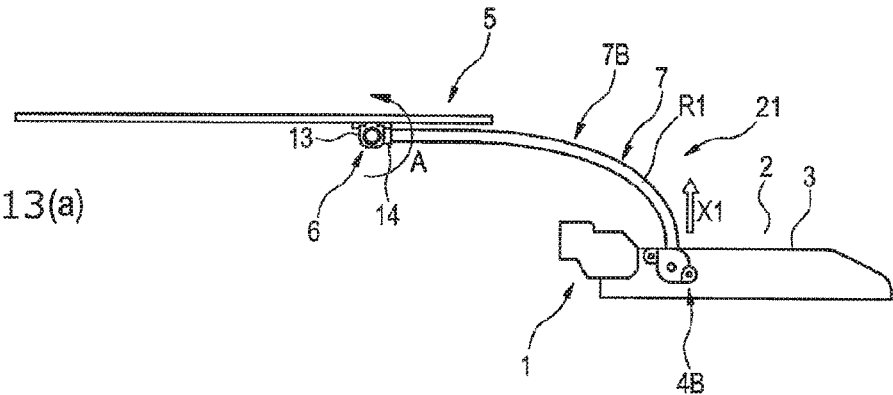
FIG. 13(a) is a plan view showing a state that a slide door having a wire harness according to a third embodiment of the invention is fully opened.
Figure 13B:
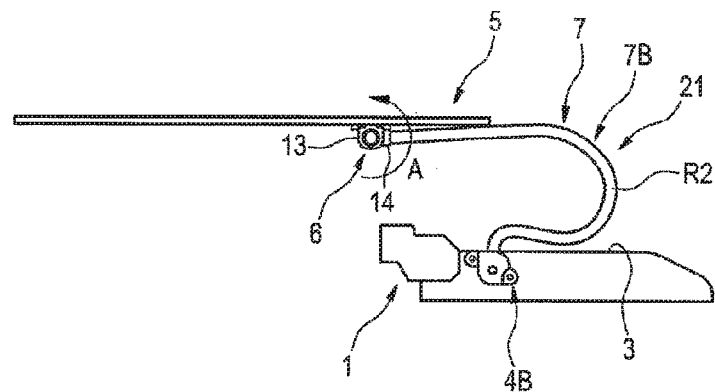
FIG. 13(b) is a plan view showing a state that the slide door having the wire harness according to the third embodiment is opened halfway.
Figure 13C:
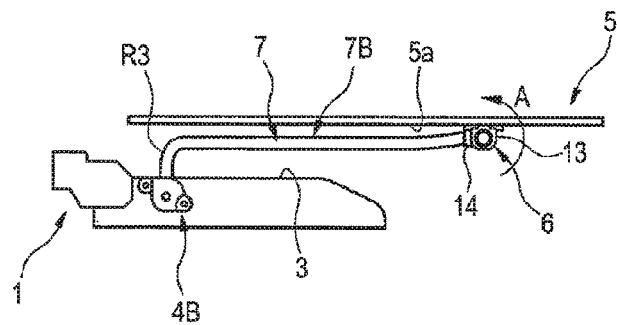
FIG. 13(c) is a plan view showing a state that the slide door having the wire harness according to the third embodiment is fully closed.

FIG. 13(*a*) is a plan view showing a state that a slide door having a wire harness according to a third embodiment of the invention is fully opened. FIG. 13(*b*) is a plan view showing a state that the slide door having the wire harness according to the third embodiment is opened halfway. FIG. 13(*c*) is a plan view showing a state that the slide door having the wire harness according to the third embodiment is fully closed.

The wire harness 7B according to the third embodiment is a partially improved version of the wire harness according to the first embodiment.

The improvement is as follows. The other end of the corrugated tube 7 which is an exterior member housing a bundle of cables is fixed to a vehicle-body-side power supply tool 4B which is attached to the step 3 at a vehicle rear-side position. The power supply tool 4B is different from the power supply tool 4 employed in the first embodiment in that an end of the corrugated tube 7 is simply supported by it fixedly. That is, unlike the power supply tool 4 employed in the first embodiment, the power supply tool 4B employed in the third embodiment is not equipped with any mechanism for supporting the end of the corrugated tube 7 so that it is rotatable in a horizontal plane about a vertical axis; the end of the corrugated tube 7 is supported fixedly by the power supply tool 4B so as to extend in the width direction of the vehicle body (i.e., in the direction indicated by arrow X1 in FIG. 13(*a*)).

The wire harness 7B according to the third embodiment is the same as the wire harness according to the first embodiment except for the above improvement. That is, one end of the wire harness 7B according to the third embodiment is supported rotatably in a horizontal plane about the vertical axis by the slide-door-5-side power supply tool 6 employed in the first embodiment, and is urged so as to rotate in the direction indicated by arrow A in FIG. 13(*a*) by the spring member 15 (see FIG. 7(*a*)) which is incorporated in the power supply tool 6. Constituent members, having the same ones in the first embodiment, of the wire harness 7B according to the third embodiment will be given the same symbols as the latter, and descriptions therefor will be omitted or simplified.

In the above-described wire harness 7B according to the third embodiment, when the slide door 5 is in the full open state, as shown in FIG. 13(*a*), the corrugated tube 7 extends approximately straightly from the slide-door-5-side power supply tool 6 toward the vehicle body front side and the other end of the corrugated tube 7 is connected to the power supply tool 4B in such a manner that it assumes a curve R1 that is approximately like a quarter arc in a region that is close to the power supply tool 4B disposed on the step 3. Since the curve R1 that is approximately like a quarter arc is a bend that is in a smaller angular range than, for example, a bend of a case that the corrugated tube 7 is bent by about 180° in a U-shape, the radius of curvature of the curve R1 larger than that of the U-shaped bend. Therefore, the load that is imposed on the wire harness 7B because of the bending can be made light. In addition, even in a case that the interval between the step 3 and the slide door 5 in the vehicle body width direction is short, the wire harness 7B can be bent easily. As a result, the space that should be secured on the vehicle side to allow the corrugated tube 7 to bend can be minimized in size.

In the above-described wire harness 7B according to the third embodiment, when the slide door 5 is in the half-open state, as shown in FIG. 13(*b*), the one end of the corrugated tube 7 is kept parallel with the inner side surface of the slide door 5 by means of the spring member 15 which is provided in the power supply tool 6 and an intermediate portion of the corrugated tube 7 is bent so as to assume a curve R2 that is approximately like a U-shape. Since the curve R2 that is approximately like a U-shape is a bend having a larger radius of curvature than, for example, bends of a conventional case that the corrugated tube 7 is bent in an S-shape. Therefore, the load that is imposed on the wire harness 7B because of the bending can be made light. In addition, even in a case that the interval between the step 3 and the slide door 5 in the vehicle body width direction is short, the wire harness 7B can be bent easily. As a result, the space that should be secured on the vehicle side to allow the corrugated tube 7 to bend can be minimized in size.

In the above-described wire harness 7B according to the third embodiment, when the slide door 5 is closed fully, as shown in FIG. 13(*c*), the one end of the corrugated tube 7 is rotated so as to be directed to the vehicle body rear side by means of the mechanism (provided in the power supply tool 6) that pivotally supports the one end of the corrugated tube 7 so that it is rotatable in a horizontal plane. As a result, a curve R3 that is approximately like a quarter arc is formed only by the other end, fixed to the power supply tool 4B, of the corrugated tube 7. Since the curve R3 is also a simple bend formed on one side, the load that is imposed on the wire harness 7B because of the bending can be made light.

In other words, the above-described wire harness 7B according to the third embodiment is a wire harness that is equipped with the corrugated tube 7 the one end of which is attached to the slide door 5 which is a slide structural body and the other end of which is attached to the step 3 of the vehicle body 1 which is a fixed structural body. The one end of the corrugated tube 7 is supported pivotally so as to be rotatable in a horizontal plane about the vertical axis that passes through the one end of the corrugated tube 7 and is urged forward in the closing direction in which the slide door 5 is closed with respect to the step 3 among a circumference direction around the vertical axis, whereby the corrugated tube 7 can be bent in a U-shape.

The other end of the corrugated tube 7 is fixed so as not to be rotated in a horizontal plane.

As a result, when the slide door 5 which is a slide structural body is in the half-open state, an intermediate portion of the corrugated tube 7 is bent so as to assume a curve R2 that is approximately like a U-shape. Since the curve R2 that is approximately like a U-shape is a bend having a larger radius of curvature than bends of a conventional case that the corrugated tube 7 is bent in an S-shape. Therefore, the load that is imposed on the wire harness 7B because of the bending can be made light. In addition, even in a case that the interval between the step 3 and the slide door 5 in the vehicle body width direction is short, the wire harness 7B can be bent easily. As a result, the space that should be secured on the vehicle side to allow the corrugated tube 7 to bend can be minimized in size.

In the above-described wire harness 7B according to the third embodiment, the vehicle-body-1-side power supply tool 4B to which the other end of the corrugated tube 7 is connected has such a structure that the other end of the corrugated tube 7 is fixed to it. Therefore, the power supply tool 4B can be made simpler in structure and hence lower in size and cost than in the case that the other end of the corrugated tube 7 is supported so as to be rotatable in a horizontal plane.

Furthermore, the power supply tool 6 which connects the one end of the corrugated tube 7 to the slide door (slide structural body) 5 is equipped with the spring member 15 for urging the corrugated tube 7. Therefore, at the time of full closing or half closing, the spring member 15 gives tension to the corrugated tube 7, whereby the corrugated tube 7 is kept tense. This makes it possible to prevent the corrugated tube from vibrating due to, for example, vibration that is transmitted to the vehicle or from vibrating and thereby generating noise by hitting neighboring members.

Still further, since the spring member 15 which is incorporated in the power supply tool 6 and the mechanism for making the corrugated tube 7 rotatable in a horizontal plane prevents loosening of the corrugated tube 7, they can absorb an excess length of the corrugated tube 7 and thereby prevent its loosening even if the excess length is increased due to dimensional errors or working errors.

Embodiment 4

Figure 14A:
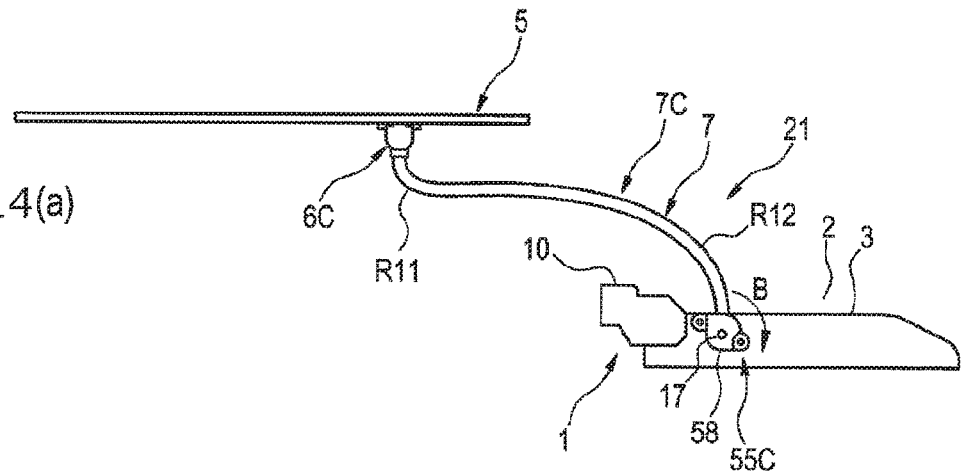
FIG. 14(a) is a plan view showing a state that a slide door having a wire harness according to a fourth embodiment of the invention is fully opened.
Figure 14B:
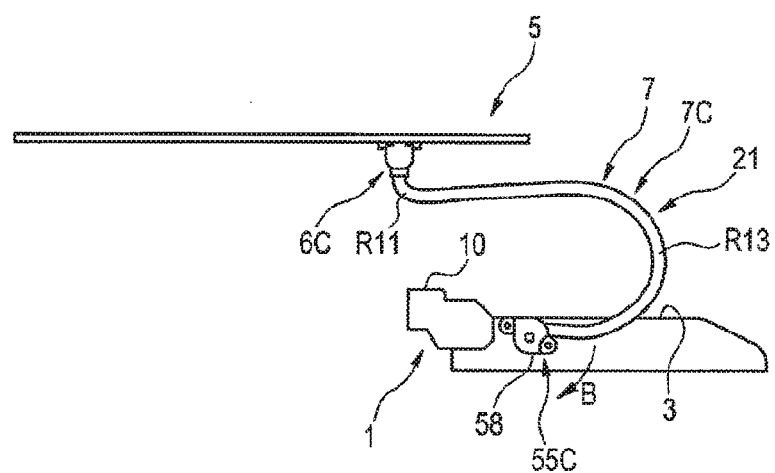
FIG. 14(b) is a plan view showing a state that the slide door having the wire harness according to the fourth embodiment is opened halfway.
Figure 14C:
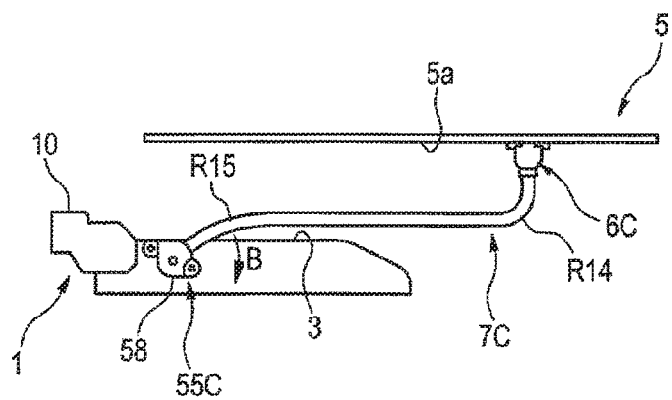
FIG. 14(c) is a plan view showing a state that the slide door having the wire harness according to the fourth embodiment is fully closed.

FIG. 14(a) is a plan view showing a state that a slide door having a wire harness according to a fourth embodiment of the invention is fully opened. FIG. 14(b) is a plan view showing a state that the slide door having the wire harness according to the fourth embodiment is opened halfway. FIG. 14(c) is a plan view showing a state that the slide door having the wire harness according to the fourth embodiment is fully closed.

In the wire harness 7C according to the fourth embodiment, one end of the corrugated tube 7 which is an exterior member housing a bundle of cables is attached to the slide door 5 which is a slide structural body via an power supply tool 6C and the other end of the corrugated tube 7 is attached to the step 3 which is a fixed structural body via an power supply tool 55C.

The power supply tool 6C is fixed to the slide door 5 with the one end of the corrugated tube 7 oriented in such a direction as to project in the vehicle body width direction. That is, the power supply tool 6C employed in the fourth embodiment is equipped with neither a mechanism for supporting one end of the corrugated tube 7 so it is rotatable in a horizontal plane nor a means for urging the corrugated tube 7 forward in the closing direction of the slide door 5.

The power supply tool 55C which supports the other end of the corrugated tube 7 is similar to the power supply tool 55 employed in the second embodiment. The power supply tool 55C is equipped with an outer member 58 (see FIG. 14(a)) which pivotally supports the other end of the corrugated tube 7 so that the other end of the corrugated tube 7 is rotatable in a horizontal plane about a vertical axis passing through it and an urging means (in the second embodiment, torsion coil spring 56) for urging the other end of the corrugated tube 7 so that it rotates in the direction indicated by arrow B shown in FIG. 14(a).

The urging means of the power supply tool 55C is an urging means that urges the other end of the corrugated tube 7 forward in the closing direction in which the slide door 5 is closed with respect to the vehicle body 1 among circumference direction around a vertical axis passing through other end of the corrugated tube 7.

Stated concisely, in the wire harness 7C according to the fourth embodiment, the one end of the corrugated tube 7 is fixed to the slide door 5, the other end of the corrugated tube 7 is connected to the step 3 of the vehicle body 1 which is a fixed structural body so that it is rotatable in a horizontal plane, and the other end of the corrugated tube 7 is urged forward in the closing direction of the slide door 5.

In the above-described wire harness 7C according to the fourth embodiment, when the slide door 5 is in the full open state, as shown in FIG. 14(a), the two respective ends of the corrugated tube 7 assume curves R11 and R12 each of which is approximately like a quarter arc. Being approximately like a quarter arc whose bending angle is smaller than in a case that the corrugated tube 7 is bent in a U-shape, each of the curves R11 and R12 can be a curve having a larger radius of curvature than in the case that the corrugated tube 7 is bent in a U-shape. Therefore, the load that is imposed on the wire harness 7C because of the bending can be made light. In addition, even in a case that the interval between the step 3 and the slide door 5 in the vehicle body width direction is short, the wire harness 7C can be bent easily. As a result, the space that should be secured on the vehicle side to allow the corrugated tube 7 to bend can be minimized in size.

In the above-described wire harness 7C according to the fourth embodiment, when the slide door 5 is in the half-open state, as shown in FIG. 14(b), the one end of the corrugated tube 7 assumes a curve R11 that is approximately like a quarter arc and an intermediate portion of the corrugated tube 7 assumes a curve R13 that is approximately like a U-shape.

Since the curve R13 that is formed in the intermediate portion of the corrugated tube 7 and is approximately like a U-shape is a bend having a larger radius of curvature than, for example, bends of a conventional case that the corrugated tube 7 is bent in an S-shape. Therefore, the load that is imposed on the wire harness 7C because of the bending can be made light.

Therefore, even in a case that the interval between the step 3 and the slide door 5 in the vehicle body width direction is short, the wire harness 7C can be bent easily. As a result, the space that should be secured on the vehicle side to allow the corrugated tube 7 to bend can be minimized in size.

In the above-described wire harness 7C according to the fourth embodiment, when the slide door 5 is closed fully, as shown in FIG. 14(c), the other end of the corrugated tube 7 is rotated so as to be directed to the vehicle body front side by means of the mechanism (provided in the power supply tool 55C) that pivotally supports the other end of the corrugated tube 7 so that it is rotatable in a horizontal plane. As a result, a curve R14 is formed only by the one end, fixed to the power supply tool 6C, of the corrugated tube 7. Since the curve R14 is also a simple bend that is formed on one side (on the vehicle body rear side) and is approximately like a quarter arc, the load that is imposed on the wire harness 7C because of the bending can be made light.

The above-described wire harness 7B according to the fourth embodiment can provide the same workings and advantages as the wire harness 7B according to the third embodiment.

Therefore, in the invention, as is apparent from the comparison between the third and fourth embodiment, if one of the two ends of the wire harness is given such a structure as to be urged forward in the closing direction of the slide door 5, the other end of the wire harness may be given such a support structure as to be fixed to a corresponding structural body.

Embodiment 5

Figure 15:
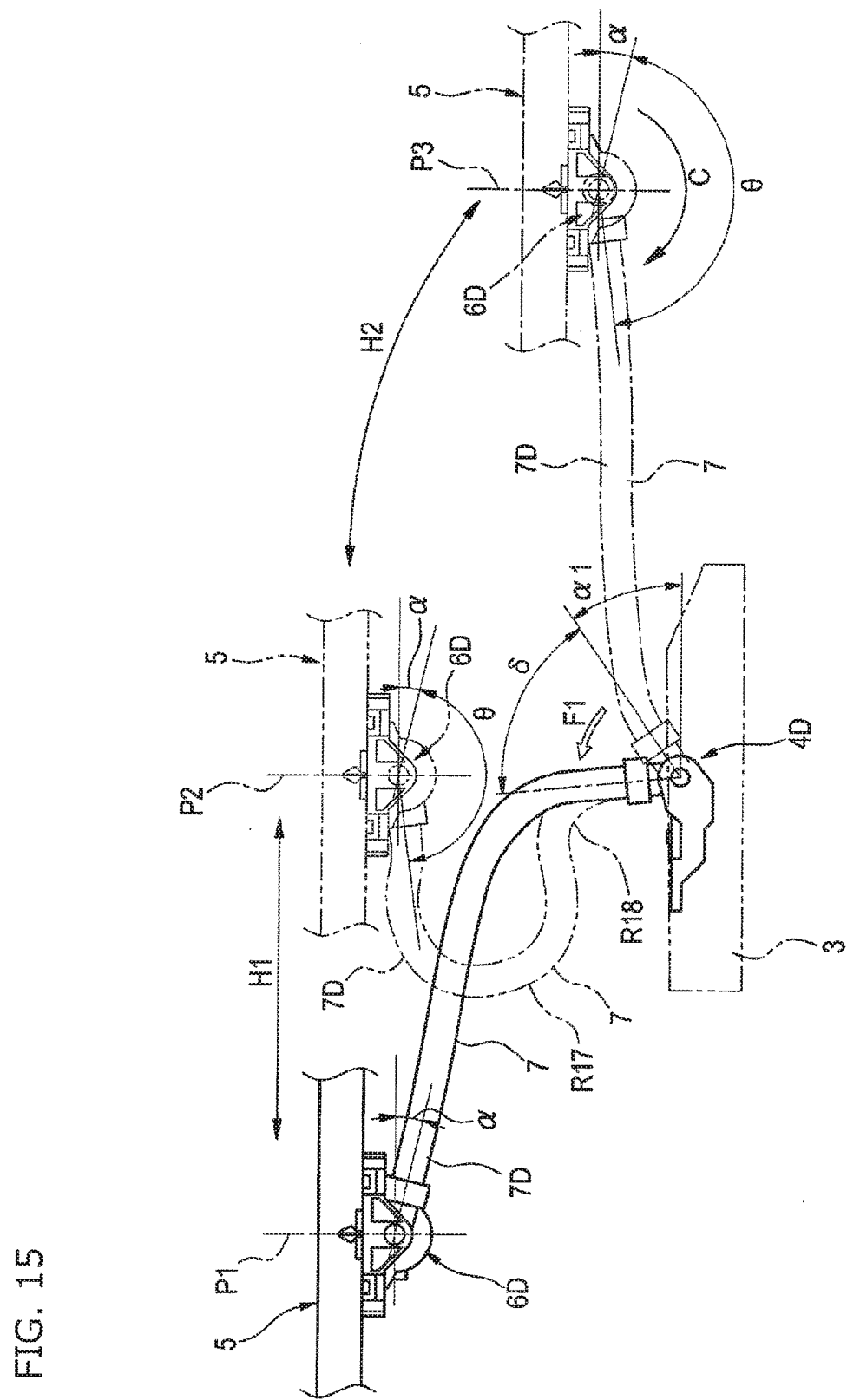
FIG. 15 is a plan view showing a slide door full open state, half-open state, and fully closed state of a wire harness according to a fifth embodiment of the invention.

FIG. 15 is a plan view showing a slide door full open state, half-open state, and fully closed state of a wire harness according to a fifth embodiment of the invention.

In the wire harness 7D according to the fifth embodiment, one end of the corrugated tube 7 which is an exterior member housing a bundle of cables is attached to the slide door 5 which is a slide structural body via an power supply tool 6D and the other end of the corrugated tube 7 is attached to the step 3 which is a fixed structural body via an power supply tool 4D.

Among three positions P1, P2, and P3 shown in FIG. 15, position P1 is a position where the center of the power supply tool 6D is located when the slide door 5 is in the full open state, position P2 is a position where the center of the power supply tool 6D is located when the slide door 5 is in the half-open state, and position P3 is a position where the center of the power supply tool 6D is located when the slide door 5 is in the fully closed state. In FIG. 15, symbol H1 denotes a movement direction in which the power supply tool 6D is moved between positions P1 and P2 and symbol H2 denotes a movement direction in which the power supply tool 6D is moved from positions P2 and P3.

The power supply tool 6D (pivotally) supports the one end of the corrugated tube 7 so that it is rotatable by an angle $\theta$ from a position having an angle $\alpha$ with respect to a reference line that extends from the center of the power supply tool 6D toward the vehicle body front side in the vehicle body front-rear direction. The power supply tool 6D incorporates an urging means (not shown) for urging the corrugated tube 7 so that it is rotated so as to be directed to the vehicle body rear side at position P3 as indicated by arrow C.

In the power supply tool 6D, the angle $\alpha$ is set at a proper value that is in, for example, a range of 0° to 15° (inclusive). The angle $\theta$ is set at a proper value that is in such a range as to satisfy a relationship $\alpha+\theta \leq 180°$.

As shown in FIG. 15, the power supply tool 4D supports the other end of the corrugated tube 7 so that the corrugated tube 7 is rotatable in an angular range $\delta$.

When the power supply tool 6D has been moved to position P3 where the slide door 5 is in the fully closed state, the power supply tool 4D supports the other end of the corrugated tube 7 at such an angular position that it is inclined by an angle $\alpha 1$ from the direction pointing to the vehicle body front side. When the power supply tool 6D has been moved to position P1 where the slide door 5 is in the full open state as a result of rotation, toward the vehicle body rear side, of the other end of the corrugated tube 7 that is caused by a manipulation of opening the slide door 5, the power supply tool 6D supports the other end of the corrugated tube 7 at such an angular position that deviates, by the angle $\delta$, from the angular position of the state that the slide door 5 is closed fully.

In the power supply tool 4D, the rotation angular range $\delta$ of the other end of the corrugated tube 7 is $0<\delta<90°$.

Referring to FIG. 15, the power supply tool 4D may be equipped with an urging means for urging the other end of the corrugated tube 7 in the direction indicated by arrow F1. An alternative configuration is possible in which the power supply tool 4D is not equipped with any urging means and merely supports, pivotally, the other end of the corrugated tube 7 so that is rotatable by the angle $\delta$.

In the wire harness 7D according to the fifth embodiment, the two respective ends of the corrugated tube 7 are supported by the power supply tools 6D and 4D. As a result, when the slide door 5 is in the half-open state, an intermediate portion of the corrugated tube 7 has a curve R17 that is convex rearward and is approximately like a U-shape. Furthermore, when the slide door 5 is in the half-open state, the corrugated tube 7 has, on the power supply tool 4D side, a curve R18 that is approximately like a quarter arc. The curves R17 and R18 shown in FIG. 15 have larger radii of curvature than, for example, bends of a conventional case that the corrugated tube 7 is bent in an S-shape. Therefore, the load that is imposed on the wire harness 7D because of the bending can be made light.

Therefore, even in a case that the interval between the step 3 and the slide door 5 in the vehicle body width direction is short, the wire harness 7D can be bent easily. As a result, the space that should be secured on the vehicle side to allow the corrugated tube 7 to bend can be minimized in size.

The invention is not limited to the above embodiments, and various modifications, improvements, etc. can be made as appropriate. The material, shape, dimensions, number (where plural ones are provided), location, etc. of each constituent element of each embodiment are optional and no limitations are imposed on them as long as the invention can be implemented.

Now, the features of the above-described wire harnesses according to the embodiments of the invention will be summarized below concisely in the form of items (1)-(8):

(1) A wire harness including an exterior member (corrugated tube 7) one end of which is attached to a slide structural body (slide door 5) and the other end of which is attached to a fixed structural body (vehicle body 1), wherein at least the one end of the exterior member is supported pivotally so as to be rotatable in a horizontal plane about a vertical axis passing through the one end of the exterior member and is urged forward or backward in a closing direction, among a circumference direction around the vertical axis, in which the slide structural body is closed with respect to the fixed structural body a circumference direction so that the exterior member is bendable in a U-shape.

(2) The wire harness according to item (1), wherein the exterior member is supported pivotally at both ends thereof so as to be rotatable in a horizontal plane about vertical axes passing through the both ends, respectively.

(3) The wire harness according to item (1) or (2), further including a slide-structural-body-side power supply tool (slide-door-side power supply tool 6) which pivotally supports the exterior member so as to be rotatable in a horizontal plane about the vertical axis passing through the one end of the exterior member, wherein the slide-structural-body-side power supply tool urges the one end side of the exterior member forward in the closing direction, among the circumference direction around the vertical direction passing through the one end of the exterior member, in which the slide structural body is closed with respect to the fixed structural body.

(4) The wire harness according to item (3), further including a fixed-structural-body-side power supply tool (vehicle-body-side power supply tool 4) which pivotally supports the exterior member so as to be rotatable in a horizontal plane about a vertical axis passing through the other end of the exterior member, wherein a longest distance (D1) between two points, in a direction in which the slide structural body and the fixed structural body are opposed to each other, of the exterior member being bent in the U-shape is greater than an interval (D2) between the slide-structural-body-side power supply tool and the fixed-structural-body-side power supply tool.

(5) The wire harness according to item (1), wherein the exterior member (corrugated tube 7) is supported pivotally at the one end so as to be rotatable in a horizontal plane about the vertical axis passing through the one end of the exterior member and the exterior member is fixed at the other end so as not to be rotatable in a horizontal plane.

(6) A wire harness including an exterior member (corrugated tube 7) one end of which is attached to a slide structural body (slide door 5) and the other end of which is attached to a fixed structural body (vehicle body 1), wherein the exterior member is supported pivotally so as to be rotatable in a horizontal plane about a vertical direction passing through the one end of the exterior member, and the exterior member is supported pivotally so as to be rotatable in a horizontal plane about a vertical axis passing through the other end of the exterior member; and the other end of the exterior member is urged forward in a closing direction, among a circumference direction around the vertical direction passing through the other end of the exterior member, in which the slide structural body is closed with respect to the fixed structural body so that the exterior member is bendable in a U-shape.

(7) The wire harness according to item (6), further including a fixed-structural-body-side power supply tool (vehicle-body-side power supply tool 4) which pivotally supports the exterior member so as to be rotatable in a horizontal plane about the vertical axis passing through the other end of the exterior member, wherein the fixed-structural-body-side power supply tool urges the other end side of the exterior member forward in the closing direction, among the circumference direction around a vertical direction passing through the other end of the exterior member, in which the slide structural body is closed with respect to the fixed structural body.

(8) The wire harness according to item (7), further including a slide-structural-body-side power supply tool (slide-door-side power supply tool 6) which pivotally supports the exterior member so as to be rotatable in a horizontal plane about the vertical axis passing through the one end of the exterior member, wherein a longest distance (D1) between two points, in a direction in which the slide structural body and the fixed structural body are opposed to each other, of the exterior member being bent in a U-shape is greater than an interval (D2) between the slide-structural-body-side power supply tool and the fixed-structural-body-side power supply tool.

Although the invention has been described in detail by referring to the particular embodiments, it is apparent to those skilled in the art that various changes and modifications are possible without departing from the spirit and scope of the invention.

The invention provides the advantage that a space that needs to be secured on the vehicle side to allow bending of an exterior member can be minimized while the design bending radius of the exterior member is increased. Providing this advantage, the invention is useful when applied to wire harnesses that are routed in the vicinity of the doorway of each of slide doors of a vehicle.

What is claimed is:

1. A wire harness comprising:
    an exterior member having one end attached to a sliding structural body and another end attached to a fixed structural body; and
    a biasing member,
    wherein at least the one end of the exterior member attached to the sliding structural body is supported pivotally so as to be rotatable in a horizontal plane about a vertical axis passing through the one end of the exterior member,
    wherein the one end of the exterior member is configured to rotate in a first rotational direction when the sliding structural body moves to an open position relative to the fixed structural body, and to rotate in a second rotational direction, opposite to the first rotational direction, when the sliding structural body moves from the open position to a closed position relative to the fixed structural body,
    wherein the biasing member is configured to bias the one end of the exterior member in one of the first rotational direction and the second rotational direction irrespective of a relative position between the sliding structural body and the fixed structural body so that the exterior member is bendable in a U-shape, and
    wherein the exterior member is configured and arranged such that a tension is applied to the exterior member when the sliding structural body is at the closed position relative to the fixed structural body.

2. The wire harness according to claim 1, wherein the exterior member is supported pivotally at both ends thereof so as to be rotatable in a horizontal plane about vertical axes passing through the both ends, respectively.

3. The wire harness according to claim 1, further comprising a slide-structural-body-side power supply tool which pivotally supports the exterior member so as to be rotatable in a horizontal plane about the vertical axis passing through the one end of the exterior member,
    wherein the slide-structural-body-side power supply tool biases the one end of the exterior member in the one of the first rotational direction and the second rotational direction, and
    wherein the slide-structural-body-side power supply tool maintains bias of the one end of the exterior member in the one of the first rotational direction and the second rotational direction irrespective of the relative position between the sliding structural body and the fixed structural body.

4. The wire harness according to claim 3, further comprising a fixed-structural-body-side power supply tool which pivotally supports the exterior member so as to be rotatable in a horizontal plane about a vertical axis passing through the other end of the exterior member,
    wherein a longest distance between two points, in a direction in which the slide structural body and the fixed structural body are opposed to each other, of the exterior member being bent in the U-shape is greater than an interval between the slide-structural-body-side power supply tool and the fixed-structural-body-side power supply tool.

5. The wire harness according to claim 1, wherein the exterior member is supported pivotally at the one end so as to be rotatable in a horizontal plane about the vertical axis passing through the one end of the exterior member and the exterior member is fixed at the other end so as not to be rotatable in the horizontal plane.

6. The wire harness according to claim 1, wherein the biasing member is configured to bias the one end of the exterior member in the first rotational direction irrespective of the relative position between the sliding structural body and the fixed structural body.

* * * * *